United States Patent [19]

Sigman

[11] Patent Number: 4,941,740

[45] Date of Patent: Jul. 17, 1990

[54] MIRROR MOUNT WITH ANNULAR FLAT DIAPHRAGM ENCIRCLING CIRCULAR MIRROR AND INCLUDING A PLURALITY OF ACTUATORS

[75] Inventor: Warren R. Sigman, North Palm Beach, Fla.

[73] Assignee: United Technologies Corporation, Hartford, Conn.

[21] Appl. No.: 369,804

[22] Filed: Jun. 22, 1989

[51] Int. Cl.⁵ .......................... G02B 7/18; G02B 5/08; G02B 26/08

[52] U.S. Cl. ..................................... 350/636; 350/486

[58] Field of Search .............. 350/636, 634, 632, 633, 350/637, 486, 487; 372/107

[56] References Cited

U.S. PATENT DOCUMENTS

| | | | |
|---|---|---|---|
| 3,751,139 | 8/1973 | Malherbe | 350/634 |
| 4,149,779 | 4/1979 | Hamerdinger et al. | 372/107 |
| 4,233,568 | 11/1980 | Hamerdinger et al. | 372/107 |
| 4,653,063 | 3/1987 | Acharekar et al. | 372/107 |
| 4,810,079 | 3/1987 | Hartlage | 350/636 |

FOREIGN PATENT DOCUMENTS

| | | | |
|---|---|---|---|
| 3028415 | 2/1980 | Fed. Rep. of Germany | 372/107 |
| 4780 | 1/1980 | Japan | 350/486 |
| 161810 | 10/1982 | Japan | 350/634 |
| 204291 | 11/1984 | Japan | 372/107 |
| 248284 | 12/1969 | U.S.S.R. | 350/634 |

Primary Examiner—Jon W. Henry
Attorney, Agent, or Firm—Edward L. Kochey, Jr.

[57] ABSTRACT

A positionally adjustable mirror is supported by an annular flat diaphragm completely encircling the mirror. High stiffness is achieved in the torsional and transverse modes. Low stiffness is achieved in the axial direction without local high stress levels being imposed on the mirror.

10 Claims, 2 Drawing Sheets

MIRROR MOUNT WITH ANNULAR FLAT DIAPHRAGM ENCIRCLING CIRCULAR MIRROR AND INCLUDING A PLURALITY OF ACTUATORS

DESCRIPTION

1. Technical Field

The invention relates to an arrangement for supporting a mirror for spatial positioning, and in particular to a low distortion support which is controllably stable.

2. Background

Fast steering mirrors which operate in space require accurate positioning and rapid repositioning. The movement required is slight, but must be accomplished at a rapid rate of speed. Resonant frequencies can establish vibrations which make control difficult and/or the resulting reflected beam unacceptable. For instance, one prior art mirror was 33 cm in diameter operating through an arc of 1.2 miliradians. This operated at a sufficient rate to establish a 100 Hz conical motion operation.

Known construction arrangements mount a mirror for adjustment of the angular position around two mutually perpendicular axes. The mirror is usually mounted on a support for pivoting about such axes by means of a universal joint. A plurality of actuators are circumferentially distributed at or close to the periphery of the mirror, with these being used to adjust the spatial position of the mirror relative to the support.

The mirror is conventionally supported around its periphery at a plurality of locations with each location being supported with a tab like flexure. Such a support is illustrated by flexures 57 of U.S. Pat. No. 4,810,079. Such flexures when connected directly to the mirror impose local loads which unacceptably deform the mirror. Accordingly, these must be secured to a supplementary support around the mirror to provide for the uniform transfer of load. This adds additional weight which must be manipulated.

Such tab type flexures are also capable of a slight twisting motion which permits vibration in the torsional mode. They also permit translational vibration in the plane of the mirror.

A proper mirror system should be free of resonances, except for those in the primary tilt mode, which must be inside the bandwidth. Pure translation modes should be avoided since they inevitably couple with the angle modes in real hardware. Unbalance or lack of symmetry caused by normal manufacturing tolerances creates a tendency for movement and such translational directions. Resonance in the translational direction typically feeds back through the structure to cause false error signals, phase changes, and sometimes uncorrectable error. Accordingly, it is a goal to remove all such modes from the bandwidth of operation while permitting free movement in the desired direction.

SUMMARY OF THE INVENTION

A positionally adjustable mirror arrangement includes a support body and a circular mirror. An annular flat diaphragm completely encircles the mirror and is preferably a shrink or interference fit thereto. The diaphragm is also secured to the support body. A plurality of actuators operate to rotate the mirror around transverse axes perpendicular to a central axis through the mirror. Such diaphragm is extremely stiff in both the torsional and translational modes while it is flexible in the direction of rotation around the transverse axes, and also flexible in the bounce mode along the central axis along the mirror. Such bounce mode may be easily restrained through the central support which rigidly supports a mirror in that direction while permitting rotation in the desired direction.

A reaction mass is similarly supported with an annular diaphragm and the plurality of actuators coact between the mirror and the reaction mass.

While each flexure connecting either the mirror or the reaction mass may be a universal joint including two pivots, it is preferably formed of a stiff rod having a transversely flexible neck.

DESCRIPTION OF THE PREFERRED EMBODIMENT

Figure 1:
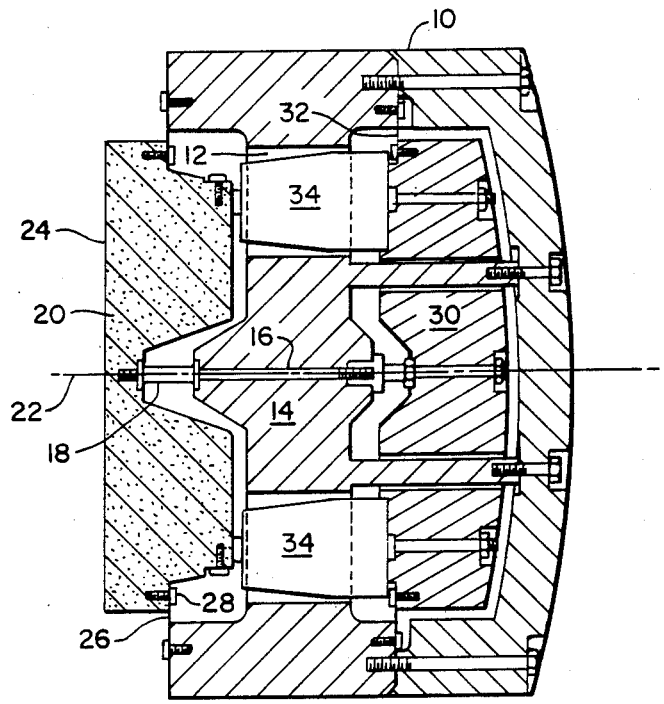
FIG. 1 is a sectional view of a mirror with a reaction mass.

A support body 10 includes a plurality of spokes 12 and a central portion 14. A central elongated axially stiff rod 16 is secured to this support body and has a transversely flexible neck 18. By means of this neck it is connected to mirror 20 along its central axis 22.

The mirror 20 is circular and formed of silicon carbide. It has a reflective face 24 and is capable of rotation around transverse axes perpendicular to the central axis 22.

A thin flexible diaphragm 26 secures the mirror 20 to the support body 10. This first annular flat diaphragm 26 completely encircles mirror 20 and is secured to the periphery thereof by bolts 28 in the illustration of FIG. 1.

This diaphragm is extremely stiff in the torsional mode, for instance $5.8 \times 10^7$ in-lb$_f$/rad, and it is also extremely stiff in the transverse direction which is along the plane of the mirror. This stiffness is greater than $4.3 \times 10^6$ lb$_f$/in. The diaphragm, however, is designed to have relatively low stiffness in the axial direction preferably between 900 lb$_f$/in and 3000 lb$_f$/in. The connection through flexure 18, however, provides extreme stiffness in the axial direction so that the mirror is resisted in a stiff manner in the axial direction. All that is permitted with reduced stiffness is rotation around the flexure point.

A cylindrical aluminum reaction mass 30 is secured to support body 10 by a second flat annular diaphragm 32. This diaphragm has the same characteristics as the first diaphragm. A plurality of actuators 34 are located between the spokes 12 of the support structure and are secured to the mirror and the reaction mass. They therefore coact between these two to position the mirror by rotating it around the transverse axes which are perpendicular to the central axis 22.

Instead of the flexure with a flexible neck, it is possible to use a flexure formed of a universal joint. However, since the universal joint inherently has some manufacturing tolerance which would permit some movement along the central axis 22, the flexible neck construction is preferred.

The described mirror is 24 cm in diameter operating through an 11 miliradian stroke and with a closed loop correction band width of 1 kz. The primary tilt resonance of the structure using a diaphragm is 80 Hz with the next resonance occuring at 11500 Hz which is bounce mode. This stiffness of the structure and all directions other than the desired rotational mode precludes undesirable resonant vibrations with the resultant control problems.

In addition to applying the appropriate flexibility to mirror 20 the diaphragm also has the advantage of absorbing any unevenness in the support mount because of its inherent flexibility in the axial direction whereby distortions are not transmitted to local loading in the mirror. As the mirror is rotated and restrained by the diaphragm, the force distribution, though varying, is uniforming varying around the periphery of the mirror and has been found to introduce no distortion in the mirror surface.

Figure 2:
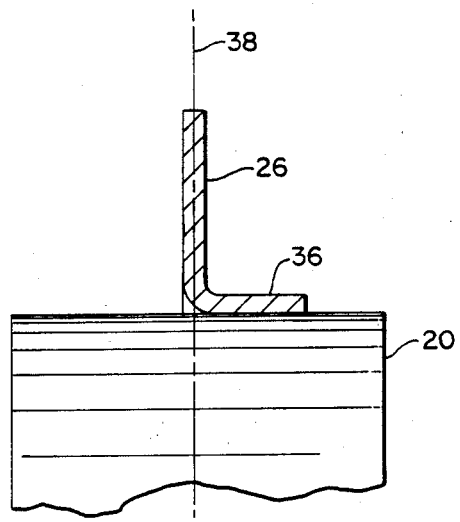
FIG. 2 is a sectional view of an alternate diaphragm to mirror connection.
Figure 3:
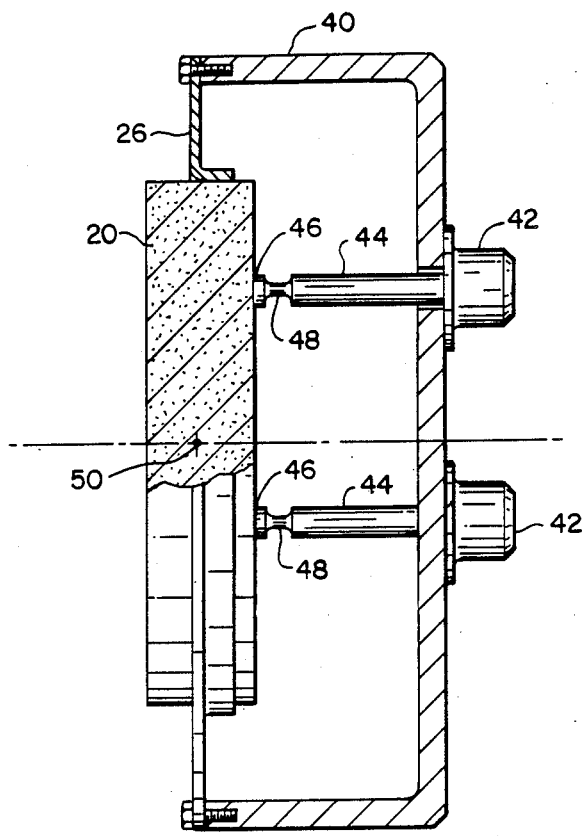
FIG. 3 is a sectional view of a modified arrangement without a simple support.

FIG. 2 illustrates an alternate method of securing diaphragm 26 to mirror 20. At the inner periphery of the diaphragm, is an annular 90 degree bent portion 36. This is placed in shrink fit relationship with the mirror to produce an interference fit. The diaphragm 26 is preferably along a transverse axes 38 passing through the center of gravity of the mirror. In FIG. 3 an alternate construction is shown which does not have a central support. Mirror 20 is again supported by diaphragm 26 from support frame 40. A plurality of actuators 42 each operate through drive rods 44 with these driver rods being connected to the mirror at locations 46. Each drive rod has a narrow flexure point 48 which permits bending in the rod. Accordingly, through proper control of the actuators the mirror may be rotated around its center of gravity 50 to achieve appropriate aiming or steering of the mirror.

I claim:

1. A positionally adjustable mirror arrangement, comprising:
   a support body;
   a circular mirror having a central axis perpendicular to the face of said mirror;
   a first annular flat diaphragm completely encircling and secured to the periphery of said mirror, and secured to said support body;
   a plurality of actuators for rotating said mirror around transverse axes perpendicular to said central axis, said transverse axes being substantially in the plane of said diaphragm.

2. A mirror arrangement as in claim 1:
   a first flexure secured to said support body and to the mirror coincident with said central axis for restraining axial movement of said mirror, but permitting rotation around said transverse axes.

3. A mirror arrangement as in claim 2:
   a circular reaction mass coaxial with said mirror;
   a second annular flat diaphragm encircling and secured to said reaction mass and secured to said support bodies;
   a second flexure secured to said support body and to said reaction mass coincident with said central axes, for restraining axial movement of said reaction mass, but permitting rotation around transverse axes; and
   said plurality of actuators coacting between said mirror and said reaction mass.

4. A mirror arrangement as in claim 2:
   said first flexure comprising a central elongated axially stiff rod having a transversely flexible neck.

5. A mirror arrangement as in claim 1:
   said diaphragm having at its inner periphery an annular 90 degree bent portion; and
   said bent portion being in interference fit relationship with said mirror.

6. A mirror arrangement as in claim 1:
   said diaphragm having a torsional stiffness greater than $3 \times 10^7$ in-$lb_f$/rad, a transverse stiffness greater than $2 \times 10^6$ $lb_f$/in, and an axial stiffness between 500 $lb_f$/in and 5000 $lb_f$/in.

7. A mirror arrangement as in claim 1:
   said diaphragm having a torsional stiffness greater than $5 \times 10^7$ in-$lb_f$/rad, a transverse stiffness greater than $4 \times 10^6$ $lb_f$/in, and an axial stiffness between 900 $lb_f$/in and 3000 $lb_f$/in.

8. A mirror arrangement as in claim 1:
   a circular reaction mass coaxial with said mirror;
   a second annular flat diaphragm encircling and secured to said reaction mass and secured to said support bodies; and
   said plurality of actuators coacting between said mirror and said reaction mass.

9. A mirror arrangement as in claim 3:
   each of said diaphragms having a torsional stiffness greater than $3 \times 10^7$ in-$lb_f$/rad, a transverse stiffness greater than $2 \times 10^6$ $lb_f$/in, and an axial stiffness between 500 $lb_f$/in and 5000 $lb_f$/in.

10. A mirror arrangement as in claim 8:
    each of said diaphragms having a torsional stiffness greater than $3 \times 10^7$ in-$lb_f$/rad, a transverse stiffness greater than $2 \times 10^6$ $lb_f$/in, and an axial stiffness between 500 $lb_f$/in and 5000 $lb_f$/in.

* * * * *